United States Patent
Jiang

(10) Patent No.: US 11,841,480 B2
(45) Date of Patent: *Dec. 12, 2023

(54) INTEGRATED WEATHER PROJECTION SYSTEMS, METHODS, AND APPARATUSES

(71) Applicant: I.M. Systems Group, Inc., Rockville, MD (US)

(72) Inventor: Le Jiang, Clarksburg, MD (US)

(73) Assignee: I.M. Systems Group, Inc., Rockville, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 17/348,887

(22) Filed: Jun. 16, 2021

(65) Prior Publication Data

US 2022/0113449 A1  Apr. 14, 2022

Related U.S. Application Data

(63) Continuation of application No. 16/700,224, filed on Dec. 2, 2019, now Pat. No. 11,048,022, which is a (Continued)

(51) Int. Cl.
*G01W 1/10* (2006.01)
*G09B 29/00* (2006.01)
(Continued)

(52) U.S. Cl.
CPC .............. *G01W 1/10* (2013.01); *G01S 13/86* (2013.01); *G08G 1/0967* (2013.01);
(Continued)

(58) Field of Classification Search
CPC ..... G01W 1/10; G01W 2203/00; G01W 1/00; G01W 2001/006; G01W 2001/003;
(Continued)

(56) References Cited

U.S. PATENT DOCUMENTS 4,035,802 A  7/1977  Jagermalm et al.
4,112,753 A  9/1978  Call
(Continued)

FOREIGN PATENT DOCUMENTS

AU  638788 B  7/1993
AU  654004 B  10/1994
(Continued)

OTHER PUBLICATIONS

International Search Report and Written Opinion dated Aug. 8, 2017 in corresponding International Application No. PCT/US2017/031963.

*Primary Examiner* — Elias Desta
(74) *Attorney, Agent, or Firm* — Arnold & Porter Kaye Scholer LLP

(57) ABSTRACT

The systems, methods, and apparatuses described herein provide integrated weather forecast products designed to assist operations managers with operational decision-making related to a designated event or set of events. The present disclosure provides a way to process weather data from various sources and in diverse data formats containing varying spatial resolutions and temporal resolutions, in order to generate an integrated and cohesive weather projection product such that the weather projection product is continuous in both spatial and temporal domains, subject to data availability, relative to a designated event or set of events.

16 Claims, 5 Drawing Sheets

Related U.S. Application Data continuation of application No. 15/584,921, filed on May 2, 2017, now Pat. No. 10,495,787.

(60) Provisional application No. 62/350,897, filed on Jun. 16, 2016.

(51) Int. Cl.
  *G01S 13/86* (2006.01)
  *G08G 1/0967* (2006.01)
  *G06N 20/00* (2019.01)
  *G08G 5/00* (2006.01)
  *G08G 5/02* (2006.01)

(52) U.S. Cl.
  CPC ......... *G09B 29/006* (2013.01); *G09B 29/007* (2013.01); *G06N 20/00* (2019.01); *G08G 5/0026* (2013.01); *G08G 5/0091* (2013.01); *G08G 5/025* (2013.01)

(58) Field of Classification Search
  CPC ...... G08G 5/00; G08G 1/0967; G08G 5/0026; G08G 5/0091; G08G 5/025
  See application file for complete search history.

(56) References Cited

U.S. PATENT DOCUMENTS

| | | |
|---|---|---|
| 4,163,216 A | 7/1979 | Arpino |
| 4,295,139 A | 10/1981 | Arpino |
| 4,907,449 A | 3/1990 | Call et al. |
| 5,156,045 A | 10/1992 | Ponkala |
| 5,347,285 A | 9/1994 | MacDoran et al. |
| 5,434,778 A | 7/1995 | Nylander |
| 5,504,577 A | 4/1996 | Lönnqvist et al. |
| 5,774,070 A | 6/1998 | Rendon |
| 5,880,836 A | 3/1999 | Lönnqvist |
| 6,735,525 B1 | 5/2004 | Murphy |
| 6,788,043 B2 | 9/2004 | Murphy et al. |
| 6,791,311 B2 | 9/2004 | Murphy et al. |
| 6,868,339 B2 | 3/2005 | Murphy et al. |
| 6,961,662 B2 | 11/2005 | Murphy |
| 7,122,820 B2 | 10/2006 | Engel et al. |
| 7,428,041 B2 | 9/2008 | Kallio et al. |
| 7,460,956 B2 | 12/2008 | Murphy et al. |
| 7,583,222 B2 | 9/2009 | O'Hora et al. |
| 7,589,666 B2 | 9/2009 | Passarelli, Jr. et al. |
| 7,827,861 B2 | 11/2010 | LaWhite et al. |
| 8,004,935 B2 | 8/2011 | LaWhite et al. |
| 8,009,513 B2 | 8/2011 | White et al. |
| 8,213,262 B2 | 7/2012 | LaWhite et al. |
| 8,930,299 B2 | 1/2015 | Pyle et al. |
| 9,778,358 B2 | 10/2017 | Selzler et al. |
| 2002/0130899 A1* | 9/2002 | Ryan ............... G06Q 30/02 709/217 |
| 2006/0085164 A1* | 4/2006 | Leyton ............... G01W 1/10 702/179 |
| 2006/0125836 A1 | 6/2006 | Lojou |
| 2007/0229348 A1 | 10/2007 | O'Hora et al. |
| 2010/0004862 A1 | 1/2010 | Gentles et al. |
| 2010/0004863 A1 | 1/2010 | Ladow et al. |
| 2012/0065788 A1 | 3/2012 | Harper, III et al. |
| 2015/0084789 A1* | 3/2015 | Groeneweg ...... G08G 1/096775 340/905 |
| 2017/0038457 A1* | 2/2017 | Wang ............... G01S 7/003 |

FOREIGN PATENT DOCUMENTS

| | | |
|---|---|---|
| AU | 663792 B | 10/1995 |
| AU | 697118 B | 9/1998 |
| AU | 2003213052 A | 9/2003 |
| AU | 2005200531 A | 8/2005 |
| AU | 2004223323 A | 10/2005 |
| AU | 2004223325 A | 10/2005 |
| AU | 2008289422 A | 2/2009 |
| AU | 2009201367 A | 4/2009 |
| AU | 2007348618 A | 5/2009 |
| AU | 2011218728 B | 4/2012 |
| BE | 866871 A | 1/1981 |
| BR | 8002817 A | 1/1981 |
| BR | PI0812242 A | 5/2017 |
| CA | 1035854 A | 8/1978 |
| CA | 1145441 A | 4/1983 |
| CA | 2036512 A | 8/1991 |
| CA | 2065485 A | 10/1992 |
| CA | 2670885 A | 10/1992 |
| CA | 2146360 A | 2/1995 |
| CA | 2152542 A | 12/1995 |
| CA | 2689189 A | 2/2009 |
| CA | 2668680 C | 12/2014 |
| CA | 2934588 A1 | 4/2015 |
| CN | 101688802 B | 3/2010 |
| CN | 102227652 B | 5/2013 |
| DE | 2820227 A1 | 11/1978 |
| DE | 4105445 A1 | 8/1991 |
| DE | 69203521 | 8/1995 |
| DE | 69203521 T2 | 2/1996 |
| DE | 69310456 | 6/1997 |
| DE | 20022811 U1 | 4/2002 |
| DE | 20380221 U1 | 12/2004 |
| DE | 102004006961 B3 | 8/2005 |
| EP | 0510846 A2 | 10/1992 |
| EP | 0583075 A1 | 2/1994 |
| EP | 0662619 A2 | 7/1995 |
| EP | 2077352 T | 11/1995 |
| EP | 0690639 A2 | 1/1996 |
| EP | 0664008 B1 | 12/1998 |
| EP | 1669929 A2 | 6/2006 |
| EP | 1804077 A1 | 7/2007 |
| EP | 2141516 A2 | 1/2010 |
| EP | 2153181 A2 | 2/2010 |
| EP | 1611446 B1 | 1/2011 |
| EP | 2350703 A1 | 8/2011 |
| FI | 781467 A | 11/1978 |
| FI | 63116 B | 12/1982 |
| FI | 85770 B | 2/1992 |
| FI | 911932 A | 10/1992 |
| FI | 90596 B | 11/1993 |
| FI | 98766 B | 4/1997 |
| FI | 113497 B | 4/2004 |
| FI | 116987 B | 4/2006 |
| FR | 2456355 A | 12/1980 |
| FR | 2661753 A | 11/1991 |
| FR | 2866116 A | 8/2005 |
| FR | 2866116 B | 4/2007 |
| GB | 1459934 A | 12/1976 |
| GB | 2050020 A | 12/1980 |
| GB | 2241787 A | 9/1991 |
| GB | 2410795 A | 8/2005 |
| IN | 02645DN2009 A | 6/2009 |
| IN | 06805CN2009 A | 3/2010 |
| IT | 1249236 B | 2/1995 |
| JP | 5113483 A | 2/1976 |
| JP | 2005227281 A | 8/2005 |
| JP | 4099485 B | 6/2008 |
| KR | 20100024400 A | 3/2010 |
| MX | 2009012674 A | 3/2010 |
| NL | 7804941 A | 11/1978 |
| RU | 2356031 C | 5/2009 |
| SE | 8003381 A | 11/1980 |
| WO | WO1995004941 | 2/1995 |
| WO | WO2003069375 | 8/2003 |
| WO | WO2003073123 | 9/2003 |
| WO | WO2004086067 | 10/2004 |
| WO | WO2004086096 | 10/2004 |
| WO | WO2006035109 | 4/2006 |
| WO | WO2008108894 | 9/2008 |
| WO | WO2008141144 | 11/2008 |
| WO | WO2009025911 | 2/2009 |
| WO | WO2010061034 | 6/2010 |
| WO | WO2016167920 | 10/2016 |

* cited by examiner

INTEGRATED WEATHER PROJECTION SYSTEMS, METHODS, AND APPARATUSES

CROSS-REFERENCE TO RELATED APPLICATIONS

This application is a continuation of U.S. application Ser. No. 16/700,224, filed Dec. 2, 2019, which is a continuation of U.S. application Ser. No. 15/584,921, filed May 2, 2017 (now U.S. Pat. No. 10,495,787, issued Dec. 3, 2019, which claims the benefit of U.S. Provisional Application No. 62/350,897, filed Jun. 16, 2016, each of which is incorporated herein in their entireties.

FIELD OF THE DISCLOSURE

The systems, methods, and apparatuses described herein relate to an integrated weather projection system designed to assist with strategic and tactical operational decision-making related to a designated event or set of events.

BACKGROUND

Weather can impact the safety, efficiency, and capacity of operations of many businesses. In some cases, weather conditions may require that a business stop operations altogether, leading to detrimental economic impacts on that business, customer dissatisfaction, and other such unwelcome consequences. Weather projection products designed to assist with operational decision-making can be particularly helpful to a business whose operations may be affected by weather conditions. Affected businesses can similarly benefit from decision-making support tools that include as inputs weather projection products covering broad spatial ranges and temporal ranges, thus facilitating both proactive and reactive operations management and minimizing the weather's adverse effects on businesses utilizing such tools.

Although various weather projection products and decision support tools are available on the market, they suffer from a fundamental flaw—namely, such products and tools operate as independent platforms, each of which generates or processes weather projections products reflecting only a subset of the spatial ranges and temporal ranges that may affect a business. As a result, businesses using such products must rely on piecemeal information regarding the weather's impact on their business operations and cannot obtain a comprehensive understanding thereof. Such informational gaps and discontinuities limit the ability of businesses to methodically manage their weather-affected operations.

A variety of weather projection products currently exist to deliver to operations managers the weather information appropriate for strategic and tactical stages of operational decision-making. For instance, weather forecasting products typically rely on physics-based numerical modeling of the interactions among various physical processes in the atmosphere and between land surface and the atmosphere. Such physics-based models usually assume initial and boundary conditions for atmospheric layers and solve in the time domain differential and partial differential fluid dynamics equations representing such physical processes. Physics-based models usually conduct data assimilation, which is a numerical process that combines a model forecast field with the available weather observation at the current time step; minimizes the difference between the forecast and such observation; and adjusts the model forecast trajectory in order to improve the forecast model at future time steps at such time intervals so as to achieve optimal results of future predicted atmospheric states, i.e., weather forecasts.

In contrast, weather nowcasting products are generally based on the tracking and extrapolation of weather features observed by weather radar and satellites that, in most cases, are persistent and continuous in short range time and space. By employing efficient image processing and statistical techniques in lieu of the physics-based equations used in weather forecasting, weather nowcasting is able to generate short term weather projections, e.g., for two hours into the future or less, and provide weather projection updates at very high frequencies, as little as every few minutes. Weather prediction updates at such rates are not presently possible with weather forecasting techniques because calculating and processing data using physics-based modelling is computationally taxing and therefore too time consuming. However, because weather forecasting techniques are physics-based, they can generate weather projections further into the future than can weather nowcasting techniques.

As an illustrative example, air traffic management and control ("ATM/C") personnel require weather information with varying spatial and temporal scopes throughout various ATM/C stages—such as flight planning, takeoff sequencing, tower control during taxiing and takeoff, terminal radar approaching control during aircraft ascent and descent, and en route area traffic control during cruising—to achieve and maintain safety, operational efficiency, and air space capacity in ATM/C.

Normally, at the strategic planning stage, e.g., more than two hours before a scheduled flight, ATM/C decision-making depends on weather forecasts for preparing and adjusting flight plans. During the strategic stage, ATM/C personnel with access to relevant weather information have the capability to manage air traffic proactively by generating re-routing plans to circumvent weather-blocked airspace, or by executing ground delay programs or ground stop programs to prevent burdening the reduced airspace capacity. Strategic ATM/C ground delay programs and ground stop programs offer improved operational aviation safety, balanced airspace demand and capacity, and reduced aviation fuel burning.

At the tactical stage, e.g., within two hours of a scheduled flight, ATM/C decision-making depends on real-time weather observation and "nowcasting," i.e., very short term weather projections. During the tactical stage, ATM/C decision-making tends to be reactive and can involve such ATM/C mechanisms as airborne holding until adverse weather impact has passed, or diverting to alternative airports aircraft that have encountered adverse weather and have fuel levels that limit their airborne time.

The currently available weather projection products applying various forecasting or nowcasting techniques operate as independent systems, and each system captures weather information from only a subset of the spatial ranges and temporal ranges that are necessary for robust strategic and tactical operational decision-making. Additionally, such weather projection products generally operate on different computing platforms and do not communicate with one another. Moreover, such weather projection products are often incompatible, therefore leading to data gaps or otherwise inadequate operations management support. In particular, the data output from one weather projection product might be prohibitively large such that it cannot be transferred to another weather projection product in a timely manner so as to adequately support operational decision-making in real time.

Thus, there are significant disadvantages associated with currently available weather projection products and decision support tools; no such currently available products equip businesses to adequately manage their operations in a safe and efficient manner in the face of weather conditions that could otherwise undermine operational execution. What is needed are systems, methods, and apparatuses that can provide integrated timely, accurate, and continuous weather information covering the entire spatial and temporal spectrum relevant to strategic and tactical operational decision-making for a designated event or set of events.

SUMMARY

Disclosed herein are systems, methods, and apparatuses that address the shortcomings in the prior art described above, and may also provide additional or alternative benefits. The systems, methods, and apparatuses described herein provide integrated weather forecast products designed to assist operations managers with operational decision-making related to a designated event or set of events. The present disclosure provides a way to process weather data from various sources and in diverse data formats containing varying spatial resolutions and temporal resolutions, in order to generate an integrated and cohesive weather projection product such that the weather projection product is continuous in both spatial and temporal domains, subject to data availability, relative to a designated event or set of events.

In an embodiment, an integrated weather projection system for assisting strategic and tactical operational decision-making related to a designated event or set of events, the system comprises a weather projection module; wherein: the weather projection module comprises one or more weather projection sub-modules; each such weather projection sub-module is configured to be communicatively coupled to one or more weather data centers storing one or more sets of weather data; each such weather projection sub-module is configured to receive a system operating parameter comprising at least one set of spatial range and temporal range in relation to the designated event or set of events; each such weather projection sub-module is configured to receive such weather data as correlates to each such system operating parameter; each such weather projection sub-module is configured to perform, based on said system operating parameter, one or more weather projection techniques, selected from the group consisting of weather forecasting and weather nowcasting; each such weather projection sub-module is configured to generate at least one weather projection model for such system operating parameter based on the received weather data; each such weather projection sub-module is further configured to perform post-processing techniques on each such weather projection module to generate weather projection fields for such system operating parameter; each such weather projection sub-module is further configured to integrate one or more such weather projection fields to yield a weather projection product for such system operating parameter; and each such weather projection product for each such system operating parameter is embedded within the weather projection product for each such system operating parameter comprising set of a larger spatial range and larger temporal range, thereby generating an integrated weather projection product; a geospatial data convertor communicatively coupled to each such weather projection sub-module and configured to convert each such weather projection product into one or more geospatial map layers; and a decision support tools module communicatively coupled to the geospatial data converter and configured to receive one or more operational constraints relating to the designated event or set of events, wherein the decision support tools module is configured to generate one or more outputs selected from the group consisting of present graphic displays, web-based map services to assist with strategic decision-making relating to the designated event or set of events, and web-based map services to assist with tactical decision-making relating to the designated event or set of events.

In another embodiment, a method of generating an integrated weather projection for assisting strategic and tactical operational decision-making related to a designated event or set of events, the method comprises receiving a system operating parameter comprising at least one set of spatial range and temporal range in relation to the designated event or set of events; receiving such weather data as correlates to each such system operating parameter, performing, based on said system operating parameter, one or more weather projection techniques, selected from the group consisting of weather forecasting and weather nowcasting; generating at least one weather projection model for such system operating parameter based on the received weather data; performing post-processing techniques on each such weather projection module to generate weather projection fields for such system operating parameter; integrating one or more such weather projection fields to yield a weather projection product for such system operating parameter; embedding each such weather projection product for each such system operating parameter within the weather projection product for each such system operating parameter comprising a larger spatial range and larger temporal range, thereby generating an integrated weather projection product; converting each such weather projection product into one or more geospatial map layers using a geospatial data converter; and communicatively coupling a decision support tools module configured to receive one or more operational constraints relating to the designated event or set of events to the geospatial data converter, wherein the decision support tools module is configured to generate one or more outputs selected from the group consisting of present graphic displays, web-based map services to assist with strategic decision-making relating to the designated event or set of events, and web-based map services to assist with tactical decision-making relating to the designated event or set of events.

DETAILED DESCRIPTION

Figure 1:
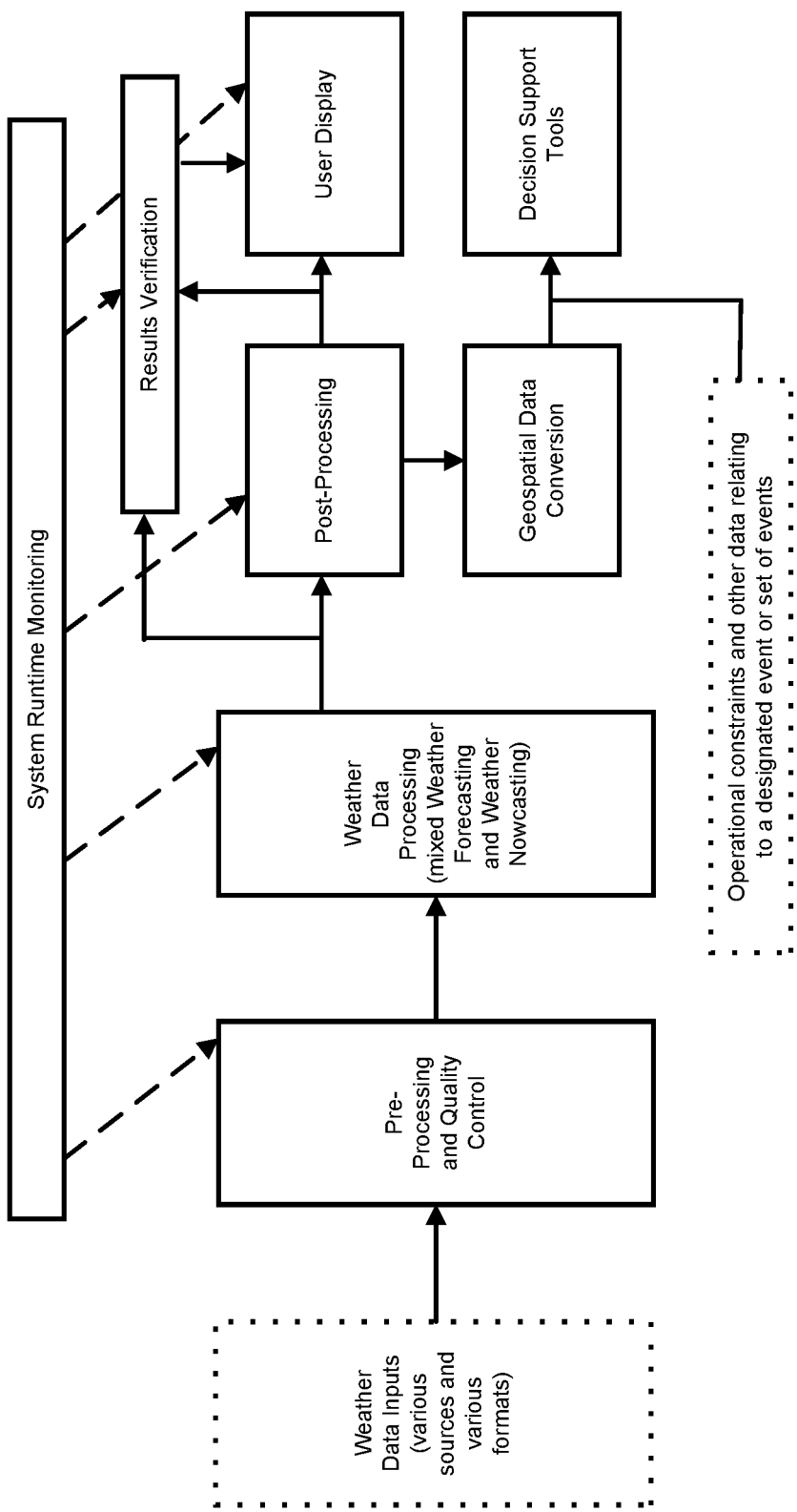
FIG. 1 is a block diagram of an exemplary system according to the present disclosure.

Certain illustrative aspects of the systems, apparatuses, and methods according to the present disclosure are described herein in connection with the following description and the accompanying figures. These aspects are indicative, however, of but a few of the various ways in which the principles of the systems, apparatuses, and methods may be employed, and the present disclosure is intended to include all such aspects and their equivalents. Other advantages and novel features of the present disclosure may become apparent from the following detailed description when considered in conjunction with the figures.

In the following detailed description, numerous specific details are set forth in order to provide a thorough understanding of the present disclosure. In other instances, well known structures, interfaces, and processes have not been shown in detail in order not to unnecessarily obscure the systems, apparatuses, and methods according to the present disclosure. However, it will be apparent to one of ordinary skill in the art that those specific details disclosed herein need not be used to practice the systems, apparatuses, and methods according to the present disclosure and do not represent a limitation on the scope thereof, except as recited in the claims. It is intended that no part of this specification be construed to effect a disavowal of any part of the full scope of the present disclosure. Although certain embodiments of the present disclosure are described, these embodiments likewise are not intended to limit the full scope of the systems, apparatuses, and methods according to the present disclosure.

As used herein, the term "weather projection" comprises "weather forecasting" and "weather nowcasting," wherein "weather forecasting" refers to a projection of weather conditions usually at least two hours in advance of a particular time of interest, based on numerical weather prediction modeling; and "weather nowcasting" refers to a projection of weather conditions usually within two hours in advance of a particular time of interest, based on lightweight fast calculation numerical extrapolation techniques. Notwithstanding the foregoing, one having ordinary skill in the art will understand that these temporal ranges are merely approximations and can be varied as appropriate. Additionally, as used herein, the term "system configurer" refers to an individual or group of individuals having ordinary skill in the art of configuring and installing an embodiment of the present disclosure. The term "user" refers to an individual or group of individuals interpreting and applying the products of an embodiment of the present disclosure.

The present disclosure provides systems, methods, and apparatuses for generating weather projection products to assist in operational decision-making related to a designated event or set of events. The present disclosure provides a way to process weather data from various sources and in diverse data formats containing varying spatial resolutions and temporal resolutions in order to generate an integrated and cohesive weather projection product such that the weather projection product is continuous in both spatial and temporal domains, subject to data availability, relative to a designated event or set of events. For example, it might be desirable to apply weather projection products to assist with air traffic management and control ("ATM/C"). In such a business case, an embodiment of the present disclosure may generate integrated weather projection products that may assist ATM/C personnel with strategic decisions, such as ground delay programs and ground stop programs, and tactical decisions, such as airborne holding or diverting aircraft to alternative airports.

FIG. 1 shows a block diagram representing an embodiment of the present disclosure. In general, data processing for generating weather projection products in an embodiment of the present disclosure may involve some or all of the following: input of weather data as configured by a system configurer; pre-processing and quality control of such data; application of weather nowcasting or weather forecasting to generate a weather projection model as appropriate for the particular weather data inputs and a user's spatial range and temporal range in relation to the designated event or set of events; data assimilation if weather forecasting is applied; post-processing to convert a weather projection models' physical variables, including, but not limited to, wind speed, temperature, and humidity, as well as the weather projection models' radar returns, into weather projection fields comprising, but not limited to, turbulence and atmospheric freezing level; results verification to verify the accuracy and reliability of each such weather projection model against observation data, subject to a system configurer's predefined set of accuracy and reliability parameters; and integrating one or more weather projection fields to yield a weather projection product, which weather projection product may be presented to a system user in one or more forms described below. For example, results verification may involve comparing a weather projection model's physical variables including, but not limited to, wind, temperature, dew point temperature, and pressure with ground-based sensor observations measuring surface wind, temperature, dew point, or pressure or soundings measuring atmospheric wind, temperature, or dew point profile from the surface to the top of the troposphere. Results verification may also involve comparing a weather projection model's radar reflectivity or echo top with radar observed reflectivity or echo top. System runtime monitoring may overlay all the processing steps and monitor the system workflow in real-time on the computing platform to automatically generate logs and alert runtime issues.

Figure 1A:
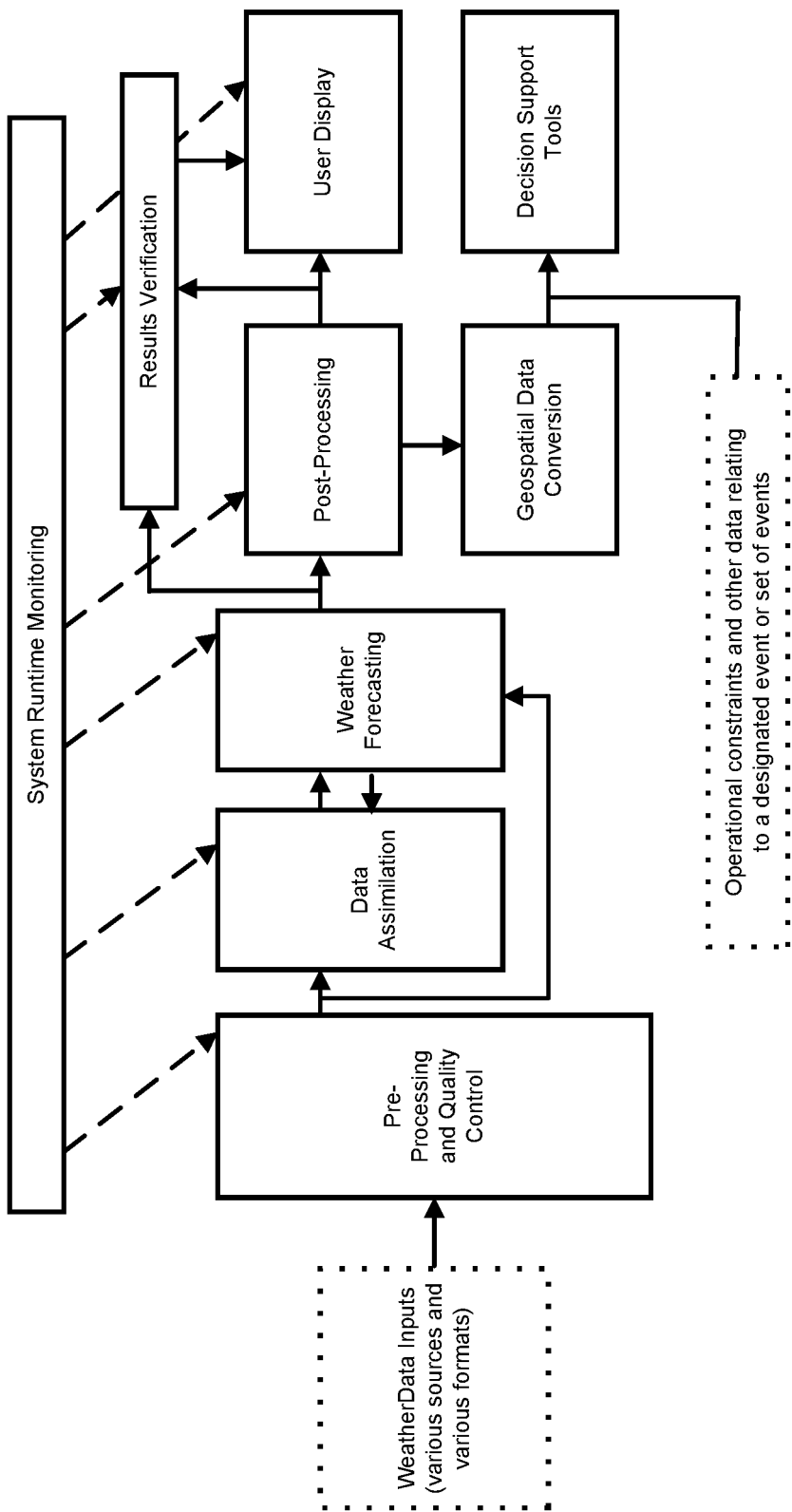
FIG. 1A is a block diagram of an exemplary system employing weather forecasting techniques according to the present disclosure.
Figure 1B:
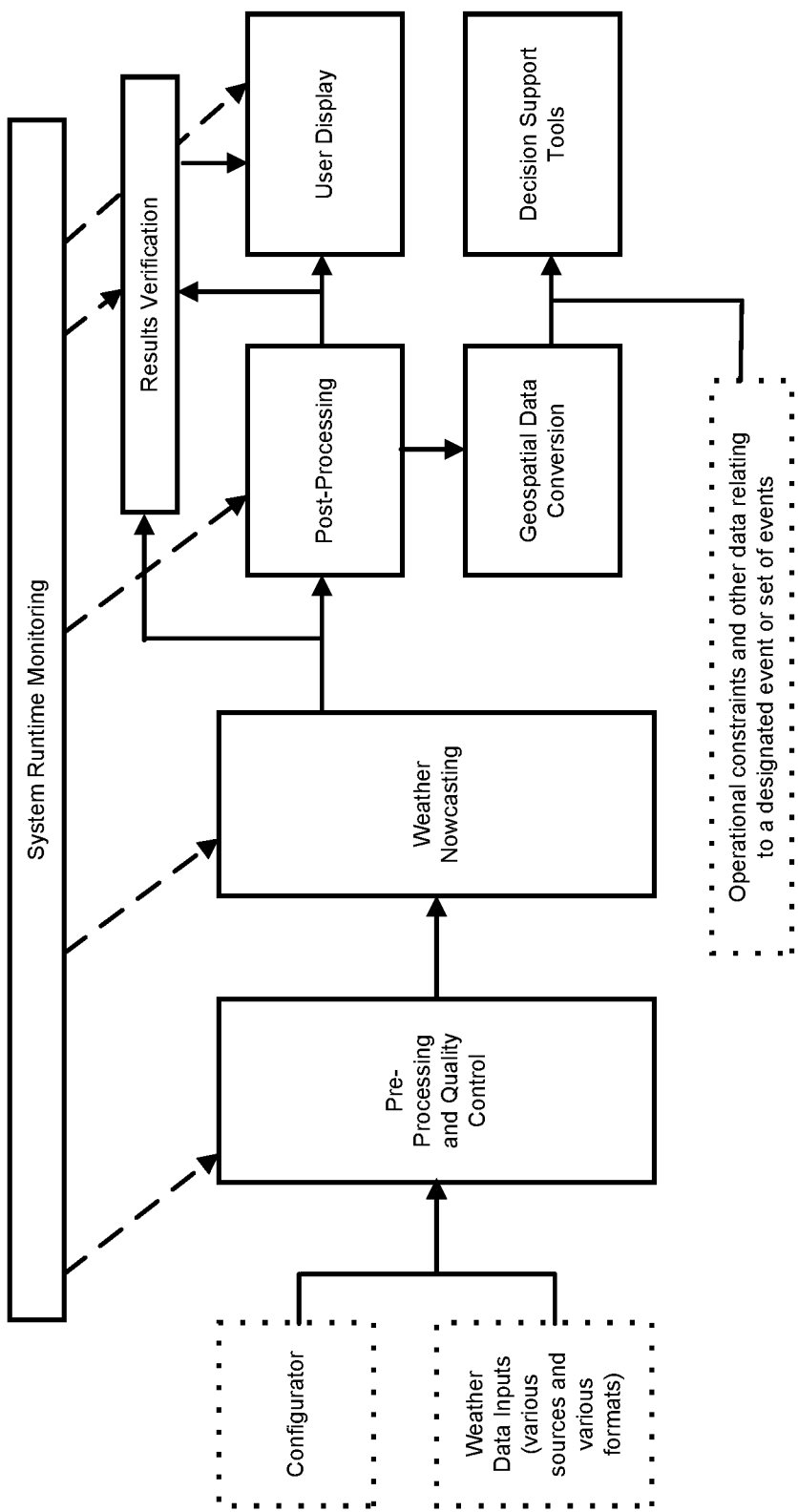
FIG. 1B is a block diagram of an exemplary system employing weather nowcasting techniques according to the present disclosure.

In one embodiment of the present disclosure, a system configurer may configure the system to identify and apply the techniques appropriate for processing the system's particular weather data inputs in order to generate weather projection products. For example, depending on the data format, as well as the spatial scope and temporal scope of the data, such weather data may undergo a combination of weather forecasting (FIG. 1A) and weather nowcasting (FIG. 1B) techniques.

In one embodiment of the present disclosure, a system configurer may configure the system to receive weather data inputs that are appropriate in quality, spatial resolution, and temporal resolution, in relation to a user's spatial range and temporal range to a designated event or set of events, such as, but not limited to, scheduled flights at an airport. A system configurer may also configure the system such that weather data inputs do not contain data redundancy. As a user's spatial range and temporal range to the designated event or set of events increases or decreases, the weather data inputs appropriate in quality, as well as spatial and temporal resolution, for generating weather projection products for such spatial range and temporal range may also change. Accordingly, a system configurer may configure the system to adjust the weather data the system may receive, such that the weather data remains appropriate for a user's spatial range and temporal range.

For example, the system in the present disclosure may be used for ATM/C, wherein such weather data inputs may include, without limitation, all or a subset of the following: Global Forecast System output; atmospheric sounding observations, e.g., vertical atmospheric profiles of weather variables including, but not limited to, temperature, dew point, pressure, and wind speed; wind profiler observations;

geostationary weather satellite infrared channels and polar-orbiting (low earth orbit) weather satellite infrared and microwave channels for atmospheric temperature profile and water vapor estimation; ground-based Doppler weather single- or multi-radar mosaic data and products; ground observations, including routine surface automatic weather observation stations, and other ground surface in situ observations of weather variables including, but not limited to, cloud ceiling and visibility; runway visual range information; anemometer data; Light Detection and Ranging (LIDAR) data; large domain numerical weather processing model forecast results; other national and internationally available numerical weather prediction model outputs; data from other specialized sensors measuring cloud ceiling, visibility, and airport runway snow and icing accumulation; aircraft observations; static or time varying ancillary data that characterizes land surface and/or atmospheric lower and upper boundaries; and analytical data products combining model outputs with ground observations that are generated by operational weather forecast centers.

In one embodiment, a system according to the present disclosure may implement a customized data input strategy, depending on the existing and evolving data infrastructure available to a user of such a system. For example, a region or nation may have a sophisticated data infrastructure such that the heterogeneous weather data relevant to the such a system are stored in a centralized database that manages the updates, distribution, and archiving of such data. As another example, a region or nation may have a number of distributed data centers, or a hybrid of a centralized database and a number of distributed data centers. Thus, a system according to the present disclosure may be configured to receive inputs from a centralized database, distributed data sources, or a combination of the two.

In one embodiment, a system according to the present disclosure may be configured to independently adapt and maintain its own input data needs based on its proximity to the data source or sources in question, so as to minimize latency and maximize computational efficiency for generating weather projection products that may assist with time-critical operational decision-making. In such an embodiment, "proximity" may refer to physical proximity, or it may also refer to the speed at which the relevant weather data is ready for use by such a system.

In another embodiment, numerous embodiments of a system according to the present disclosure may generate weather projection products through a web-based service. In this example, the weather projection products generated by the numerous embodiments of such a system could be shared among system users, thereby providing a common source of weather situational awareness among operational decision-makers. In such an embodiment, a system configurer may configure which users have access to such shared information, and may customize such access privilege as necessary to comply with users' particular management protocol and applicable IT security policy.

Figure 2:
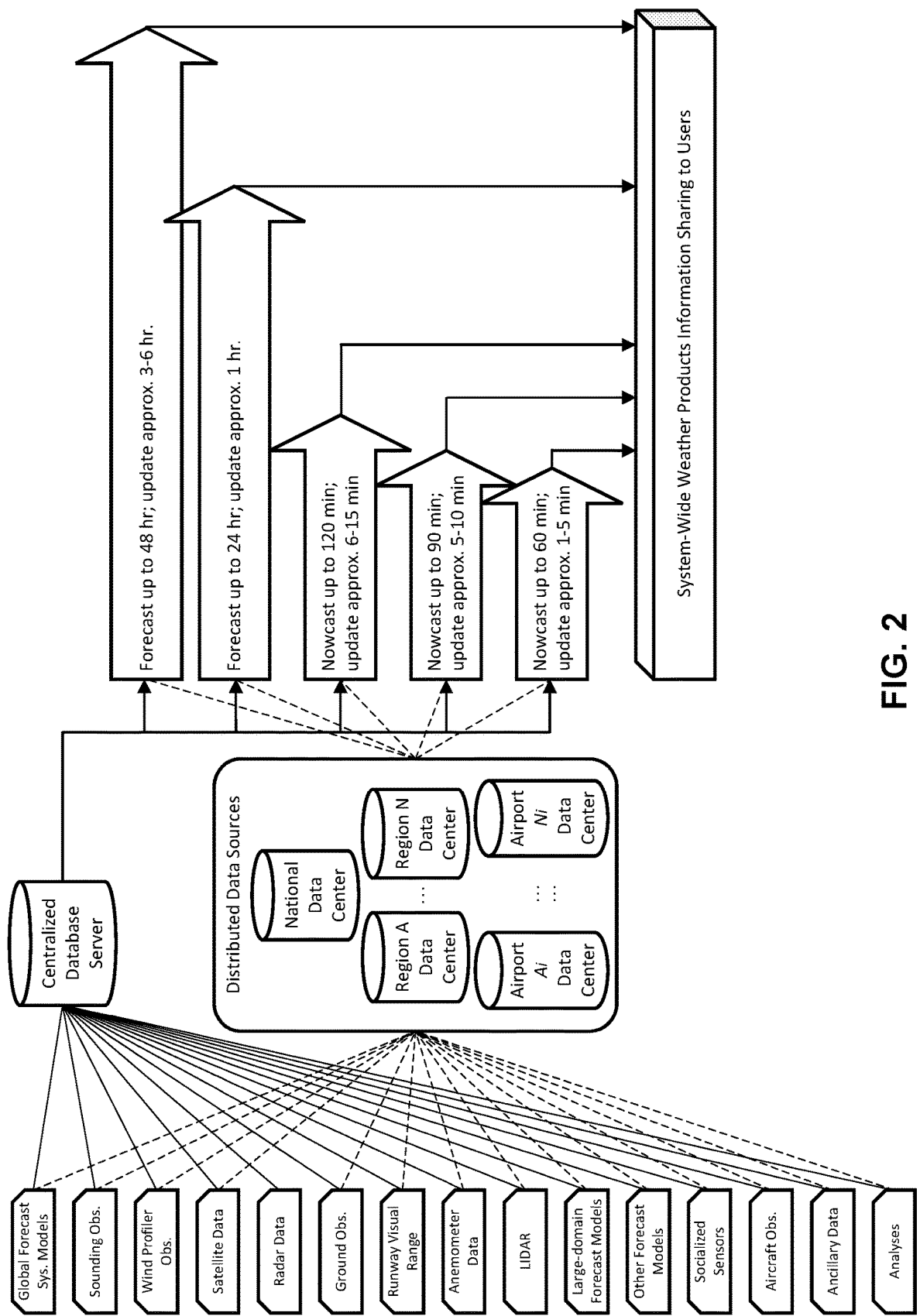
FIG. 2 is a block diagram of the data flow of an exemplary system according to the present disclosure, as applied to ATM/C.

For example, a system according to the present disclosure may be used for ATM/C. FIG. 2 is a block diagram of the weather data flow of an exemplary system according to the present disclosure, as applied to ATM/C. FIG. 2 shows examples of various weather data sources, the data of which may be stored in a centralized database or in distributed data centers at national, regional, and airport levels. Then such weather projection systems that are installed in various operationally relevant locations may be configured to receive all or a relevant subset of the weather data to perform weather forecasting or weather nowcasting. The weather projection products of the weather projection systems, which may be updated at varying time intervals, may be transferred to a system-wide information management system, to which some or all system users may have access.

In one embodiment, the system according to the present disclosure may comprise weather projection modules, each of which may comprise weather projection sub-modules, all of which are tailored to provide weather projections for certain specified system operating parameters comprising at least one set of spatial range and temporal range in relation to a designated event or set of events. A system configurer may configure such weather projection modules and weather projection sub-modules to receive weather data inputs as appropriate to each weather projection module or weather projection sub-module's specified operating parameters, and apply quality control techniques appropriate to each data type, subject to operational constraints a system configurer may define a priori and adjust as necessary based on the needs of a user. The quality control techniques applied to the weather data inputs may include, but are not limited to, removing noise from observation data, e.g., ground clutter from weather radar observations; rejecting certain observations because they exceed the permissible statistical thresholds predetermined by a system configurer; applying grid statistical interpolation to observation data to smooth out extreme values within the data and control the level of background observation error; and mapping the results onto weather projection models or other grids that may be required by other processing algorithms. In such an embodiment, a system configurer may configure the system's weather projection modules and weather projection sub-modules to apply various weather data processing techniques, such as weather forecasting (FIG. 1A) and weather nowcasting (FIG. 1B), as appropriate for the specified system operating parameters in relation to a designated event or set of events, so as to yield the most efficient and effective weather projection products.

For example, a system according to the present disclosure may be used for ATM/C, wherein a weather projection module may comprise a regional weather projection module configured to generate national and regional weather projections. In this example, a weather projection sub-module of such regional weather projection module may be a national forecasting sub-module configured to generate weather forecasts covering national airspace up to 48 hours prior to the operational event or set of events. Such a national forecasting sub-module may provide medium spatial resolution, e.g., approximately 9 km, and weather forecasts updated approximately every 3 to 6 hours, through which users, such as ATM/C personnel, may make strategic operational decisions in relation to scheduled flights in response to large-scale weather phenomena.

In this example, another weather projection sub-module of such regional weather projection module may comprise a regional forecasting sub-module configured to generate weather forecasts covering both regional and national airspace up to 24 hours prior to the operational event or set of events. Such a regional forecasting sub-module may provide high spatial resolution, e.g., approximately 3 km or less, and weather forecasts updated approximately every hour, through which users, such as ATM/C personnel, may make strategic operational decisions in relation to scheduled flights in response to short duration but high impact weather.

In this example, another weather projection sub-module of such regional weather projection module may comprise a regional nowcasting sub-module configured to generate weather nowcasts covering regional airspace up to 2 hours prior to the operational event or set of events. Such a regional nowcasting sub-module may provide high spatial resolution, e.g., approximately 3 km or less, and regional weather nowcasts updated approximately every 6 to 15 minutes, through which users, such as ATM/C personnel, may make tactical operational decisions in relation to scheduled flights, such as safely separating aircrafts and circumventing weather-impacted airspace. Such a regional nowcasting sub-module may use aviation weather products based on satellite observations, including visible, infrared, and water vapor channels, to derive rain rate, thereby benefitting from a satellite's ability to detect cloud top brightness temperature, which is an indicator of the intensity of within-cloud convection development. Such a regional nowcasting sub-module may also implement radar-derived reflectivity signals, which may be converted into rain rate, thereby benefitting from radar's ability to detect within-cloud convective structure, as well as the radar's derived echo top and maximum reflectivity, which may indicate storm intensity. Additionally, such a regional nowcasting sub-module may integrate satellite observation-derived aviation weather projection products and weather radar mosaics, if available, to achieve weather nowcasting of storm motion with the combined advantages of using each of the types of data sources. The combination of satellite and radar data products to derive rain rate provide an integrated depiction of storm motion locally observed by radar within the large scale context of hemispheric observations by geostationary satellite.

In this example, a system according to the present disclosure may be used for ATM/C, wherein another weather projection module may comprise a local weather projection module configured to generate local weather nowcasts. In this example, a weather projection sub-module of such local weather projection module may be a local nowcasting sub-module configured to generate a weather nowcast covering terminal radar approaching control for up to 90 minutes prior to the operational event or set of events. Such a local nowcasting sub-module may provide high spatial resolution, e.g., approximately 2 km or less, and severe weather nowcasts updated approximately every 5 to 10 minutes, through which users, such as ATM/C personnel, could make tactical operational decisions in relation to an aircraft's ascent and landing approach. Such a local nowcasting sub-module may apply nowcasting algorithms and rely predominantly on airport weather Doppler radar data for regional areas within a 150 km radius of the relevant location.

In this example, another weather projection sub-module of such local weather projection module may comprise a local severe weather alert sub-module configured to generate weather nowcasts covering airport runway and terminal areas for up to 60 minutes prior to the operational event or set of events. Such a local severe weather alert sub-module may provide high spatial resolution, e.g., approximately 1 km or less, and runway and terminal severe weather alerts updated approximately every 1 to 5 minutes to support the air traffic control tower for takeoff and landing. Such a local severe weather alert sub-module may focus on weather related hazards that affect flight takeoff and landing safety, including: low cloud ceiling; low visibility at or near runways due to fog or heavy precipitation, e.g., snow and rainfall; wind gusts, especially strong cross-winds on runways; low level wind shear, especially those related to very strong convection or microbursts near runways; heavy snow accumulation on runways; and runway icing. Such a local severe weather alert sub-module may integrate multiple data sources from the dense and specialized sensor networks around runways and in the vicinity of airports, apply nowcasting algorithms, and generate very rapidly updated alerts for the area on and around airport runways.

For the avoidance of doubt, one having ordinary skill in the art will understand that the time and distance intervals set out in the foregoing examples are merely exemplary, and may be adjusted as appropriate for the intended application.

In an embodiment of the system in the present disclosure, weather projection modules and weather projection sub-modules for different regions, configured to generate weather projection products for their respective received system operating parameters, may apply weather forecasting and weather nowcasting techniques that generate weather data products that are compatible with each other. Thus, the weather projection products generated by each such weather projection module and weather projection sub-module for each such received system operating parameter may be integrated into one integrated weather projection product comprising all, or a subset of, the weather projection products generated by the set of modules and sub-modules comprising such integrated weather projection system. Such integrated weather projection system may conduct parallel computing methodologies and facilitate resource-sharing among weather projection modules and weather projection sub-modules, including but not limited to the sharing of software code libraries; parallel computing methodology; ancillary data, e.g., land surface classification; common data quality control procedures; and calculated and converted geospatial map layers, thereby enhancing the consistency and efficiency of such weather projection modules' and weather projection sub-modules' performance and products.

In such an embodiment, weather projection products generated by weather projection modules and weather projection sub-modules configured to generate weather projections of higher resolution and smaller scale based on received system operating parameters may be embedded within weather projection products generated by weather projection modules or weather projection sub-modules configured to generate weather projections of coarser resolution and larger scale. Such an embedding structure may enable local system users to view their local weather projection products in the context of a larger scale weather situation.

Thus, in an exemplary embodiment of the present disclosure, each of the exemplary regional weather projection module and local weather projection module, including the exemplary sub-modules therein, namely, the national forecasting sub-module, the regional forecasting sub-module, the regional nowcasting sub-module, the local nowcasting sub-module, and the local severe weather alert nowcasting sub-module, may interface with each other so as to create an integrated weather projection system producing an integrated weather projection product that is continuous in the temporal domain and spatial domain covered by the exemplary weather projection modules and weather projection sub-modules, subject to data availability. As an example, the national forecasting sub-module, the regional forecasting sub-module, the regional nowcasting sub-module may be embedded within the regional weather projection module. Similarly, the local nowcasting sub-module and the local severe weather alert nowcasting sub-module may be embedded within the local weather projection module. Additionally, the local weather projection module may be embedded in the local nowcasting sub-module, which may be embedded in the regional nowcasting sub-module, which may be embedded in the regional forecasting sub-module, which may be embedded in the national forecasting sub-module.

In one embodiment of the present disclosure, the exemplary weather projection modules, including some or all of the weather projection sub-modules therein, may be installed in various locations that are relevant to a designated event or set of events. Each installation may include the weather projection modules and weather projection sub-modules appropriate for a user's spatial range and temporal range in relation to the designated event or set of events. A system configurer may configure each installed weather projection module or weather projection sub-module such that it has adequate access to the weather data that it may typically process. Accordingly, the computational workload for each of the weather projection modules and weather projection sub-modules may be distributed among the installed weather projection modules and weather projection sub-modules, depending on the system's access to the various weather data inputs. For example, the heavy computational workload may be accomplished at locally installed systems, and the resulting weather projection products—which have much smaller data volume than the inputs—may be assembled into a desired data center designed to have enough storage and bandwidth to serve system users through an internet connection.

In an embodiment of the present disclosure, once each local weather projection module or weather projection sub-module is installed and configured, each may be connected to an IT infrastructure to access the internet. In such an embodiment, users at each of the locations may gain system-wide information access to view the output of every weather projection module and weather projection sub-module installed and configured in every other location, or a subset thereof, that is connected to the system network. As a result, such an embodiment of the system according to the present disclosure may provide a common operating picture for users and enhance each user's real-time weather situational awareness. In addition, the integrated weather projection products may generate weather information containing spatial and temporal continuity, subject to data availability, under a common software architecture that optimizes software code efficiency and maintains consistency and cohesiveness among every service function and any variations therein. Participation in and access to such an integrated weather projection product may be available to all users of an embodiment of the present disclosure, or only to users within a specific network of users, or any combination thereof, depending on the configuration desired by users and implemented by the system configurer.

Figure 3:
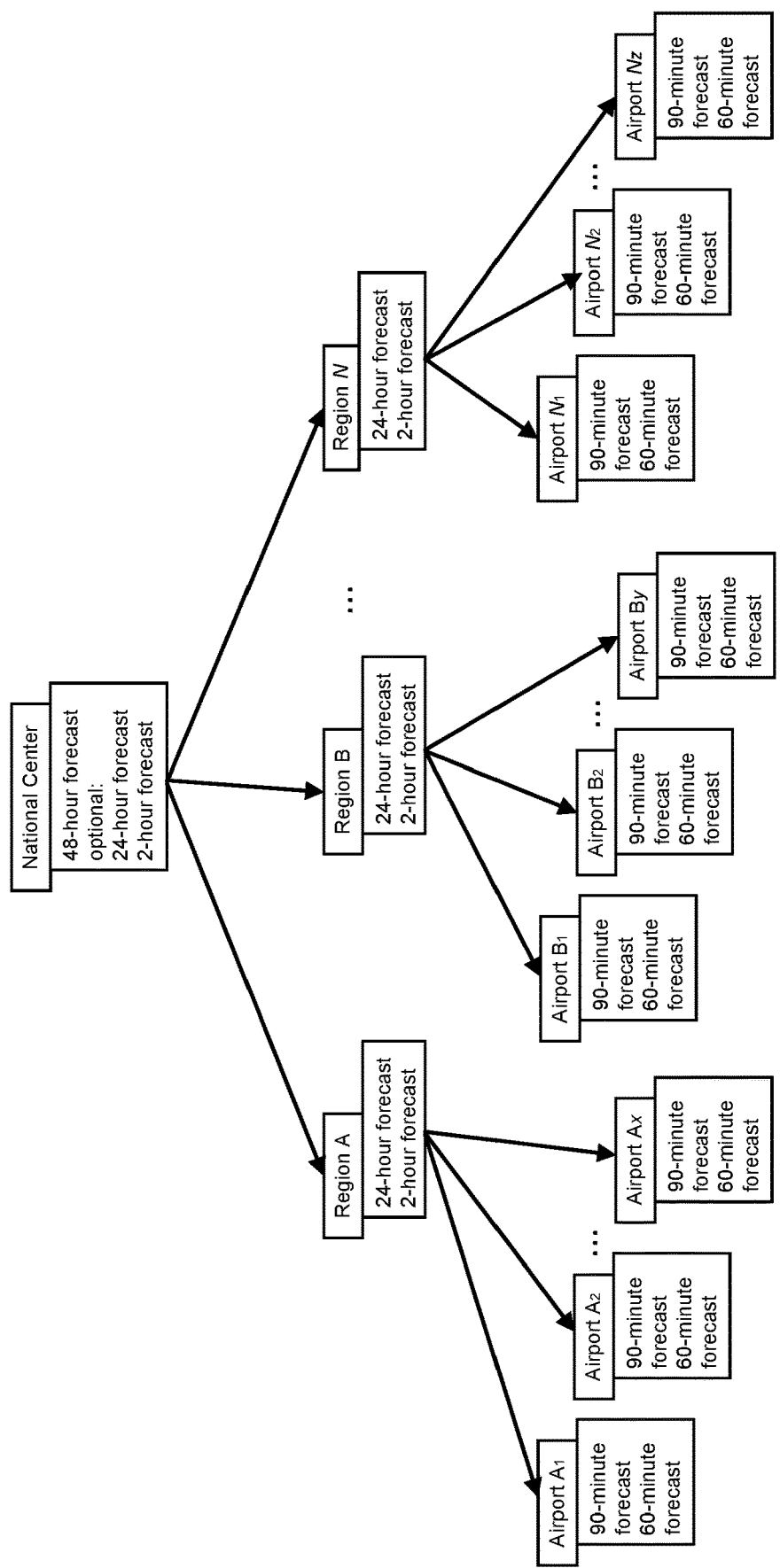
FIG. 3 is a diagram of the installation architecture of an embodiment of the present disclosure, as applied to ATM/C.

For example, a system according to the present disclosure may be used for ATM/C, for which the exemplary weather projection modules, including some or all of the weather projection sub-modules therein, may be installed at a national center, a regional center, or an airport. FIG. 3 provides a diagram showing the installation architecture of such an exemplary embodiment, as applied to ATM/C. The processed weather data in such an exemplary system may include weather projection products for regional, national, and international airspace, as well as for airport runway and terminal areas, ranging to approximately 48 hours preceding the relevant scheduled flights. Such weather projection products may be integrated by an embodiment of the present disclosure, such that all users—ATM/C personnel in this example—at any node depicted in FIG. 3 (i.e., the National Center, Region N, or Airport $N_2$) may view all weather projection products, or a subset thereof, generated by the system's installed and configured weather projection modules and weather projection sub-modules at the other nodes. As a result, ATM/C personnel may operate with a common operating picture of weather information containing spatial and temporal continuity leading up to each scheduled flight and apply real-time weather situational awareness to ATM/C decision-making.

For the avoidance of doubt, one having ordinary skill in the art will understand that the installation configuration set out in the foregoing example is merely exemplary, and may be adjusted as appropriate for the intended application.

In one embodiment of the present disclosure, integrated weather projection products may be graphically displayed to a user. For example, in an embodiment of this disclosure, a graphical display may comprise a Quick View interface, which may include a combination of pre-saved images of weather projection fields that may be layered over a map of the geographic area of interest, as well as dynamically generated images for less frequently viewed weather projection fields, thereby saving system memory space and minimizing processing time by avoiding storing product images or data plots for every weather projection field at each weather projection time step. A Quick View interface may have access to both primary products and secondary parameters that may be automatically generated by the applied weather projection post-processing techniques, or may be generated on-demand by a system user through a web-based graphic user interface. Primary products comprise those weather projection fields that are directly relevant to a user's decision making needs, including but not limited to: composite reflectivity and echo top data from radar, which may indicate the range and intensity of a storm cell; wind speed, which may indicate the presence of a jet stream or wind gusts that may affect flight safety; and freezing level and turbulence index, which may affect flight safety. Secondary parameters comprise weather projection fields that may require weather expertise to interpret, including but not limited to, 500 hPa geopotential height, mixing ratio, relative humidity, dew point, and convective available potential energy. A Quick View interface may allow system users to perform overlays for multiple weather elements at different vertical levels but may limit a system user's options to perform advanced analyses, queries, or other geospatial operations that may be relatively time-consuming or require a large amount of system processing power, such as, but not limited to and not necessarily including, zooming in or out or overlaying a forecast model cloud ceiling field on runway locations.

An embodiment of the present disclosure may include an additional module, namely, a decision support tools module. The various weather projection products of one or more weather projection modules and weather projection sub-modules may be converted to geospatial map layers, which may be integrated into an integrated weather projection product thereafter. The decision support tools module may be configured to receive the geospatial map layers or the integrated weather projection product, as well as operational constraints relating to a designated event or set of events. In turn, the decision support tools module may generate outputs designed to assist system users in operational strategic and tactical decision-making with respect to the designated event or set of events, including but not limited to graphic displays or web-based map services. The decision support tools module may generate such outputs by performing geospatial calculations, including but not limited to intersecting, sub-setting, and joining, which synthesize weather projection products and received operational constraints. For example, such a decision support tools module may be used for ATM/C, wherein the weather projection products generated by the exemplary weather projection modules and weather projection sub-modules comprising an embodiment of the system as applied to ATM/C may be converted to geospatial map layers and input into a decision support tools module, either as individual geospatial map layers or as an integrated weather projection product comprising an integrated set of geospatial map layers. In this example, airspace constraints and other relevant ATM/C operational constraints may also be input into a decision support tools module. Such ATM/C operational constraints may comprise static and dynamic constraints, including but not limited to scheduled or real-time and flight status, historical or real time air traffic patterns, fly/no-fly thresholds, and strategic and tactical decision scenarios. Such decision support tools module may be configured to generate products to assist ATM/C personnel with strategic and tactical decision-making in relation to scheduled flights, including but not limited to graphic displays or web-based map services.

The methods disclosed herein comprise one or more steps or actions for achieving the described method. The method steps and/or actions may be interchanged with each other without departing from the scope of the present disclosure. In other words, unless a specific order of steps or actions is required for proper operation of the embodiment, the order and/or use of specific steps and/or actions may be modified without departing from the scope of the present disclosure.

What is claimed is:

1. An integrated weather projection system for assisting strategic and tactical operational decision-making related to a designated event or set of events, the system comprising:
   (a) a weather projection module comprising one or more weather projection sub-modules, including at least one local sub-module, at least one regional sub-module, and at least one national sub-module, wherein each of the weather projection sub-modules is configured to:
      receive a system operating parameter indicating at least a spatial range and temporal range, wherein a regional spatial range of the at least one regional sub-module has comparatively further distance than a local spatial range of the at least one local sub-module, and wherein a national spatial range of the at least one national sub-module has a comparatively further distance than the regional spatial range; and
      generate a weather projection product based on the received system operating parameter, wherein the weather projection module is configured to generate an integrated weather projection product that is based on each weather projection product generated by each weather projection sub-module;
   (b) a geospatial data converter communicatively coupled to the weather projection module and configured to convert each weather projection product into one or more geospatial map layers; and
   (c) a decision support tools module communicatively coupled to the geospatial data converter and configured to generate one or more graphical display outputs;
   wherein the weather projection module is installed at one or more locations relevant to air traffic management and control, and wherein computational workload of the integrated weather projection system is distributed among each of the one or more weather projection sub-modules.

2. The system of claim 1, wherein to generate the weather projection product, each of the weather projection sub-modules is configured to:
   receive one or more sets of weather data correlated to the spatial range and temporal range of the received system operating parameter; and
   perform, on the one or more sets of weather data received, one or more weather projection techniques selected from the group consisting of weather forecasting and weather nowcasting, wherein the weather projection product is based on the performance of the one or more weather projection techniques.

3. The system of claim 2, wherein the weather projection module is configured to be communicatively coupled to one or more weather data centers storing the one or more sets of weather data.

4. The system of claim 3, wherein the one or more weather projection sub-modules are further configured to perform post-processing techniques on each of the weather projection models to generate one or more weather projection fields for each system operating parameter.

5. The system of claim 4, wherein the one or more weather projection sub-modules are further configured to integrate the one or more weather projection fields to generate a weather projection product for each system operating parameter.

6. The system of claim 2, wherein the one or more weather projection sub-modules are further configured to generate at least one weather projection model for each system operating parameter based on the one or more sets of weather data.

7. The system of claim 1, wherein to generate the integrated weather projection product, the weather projection module is configured to embed at least a weather projection product for a first system operating parameter within a weather projection product for a second system operating parameter, thereby generating a first integrated weather projection product, wherein the spatial range and temporal range of the second system operating parameter are larger than the spatial range and temporal range of the first system operating parameter.

8. The system of claim 7, wherein to generate the integrated weather projection product, the weather projection module is further configured to embed the first integrated weather projection product within a weather projection product for a third system operating parameter, thereby generating a second integrated weather projection product, the second integrated weather projection product comprising the integrated weather projection product, wherein the spatial range and temporal range of the third system operating parameter are larger than the spatial range and temporal range of the second system operating parameter.

9. The system of claim 1, wherein the one or more geospatial map layers are based on the respective sets of spatial range and temporal range.

10. The system of claim 1, wherein the decision support tools module is further configured to receive one or more operational constraints relating to the designated event or set of events.

11. The system of claim 1, wherein the one or more graphical display outputs is selected from the group consisting of present graphic displays, web-based map services to assist with strategic decision-making relating to the designated event or set of events, and web-based map services to assist with tactical decision-making relating to the designated event or set of events.

12. The system of claim 1, wherein said designated event or set of events is a scheduled commercial flight or set of flights.

13. The system of claim 1, wherein the spatial range of the system operating parameter ranges from local to national air space, and the temporal range of the system operating parameter ranges from the present to 48 hours in the future.

14. The system of claim 1, wherein the integrated weather projection product is graphically displayed on a quick view interface.

15. The system of claim 1, wherein the one or more locations comprise one or more of a national center, a regional center, and an airport.

16. The system of claim 1, wherein users at each of the one or more locations can view each weather projection product and integrated weather projection product generated by a weather projection module installed at any of the one or more locations.

* * * * *